Dec. 4, 1923.　　　　　　　　　　　　　　　　　　　1,476,638
J. W. OSBORN
TOWING DEVICE
Filed March 21, 1921　　　　　　　2 Sheets-Sheet 1

Inventor
J. W. Osborn,

By
Geo. P. Kimmel.　Attorney

Dec. 4, 1923.   J. W. OSBORN   1,476,638
TOWING DEVICE
Filed March 21, 1921    2 Sheets-Sheet 2
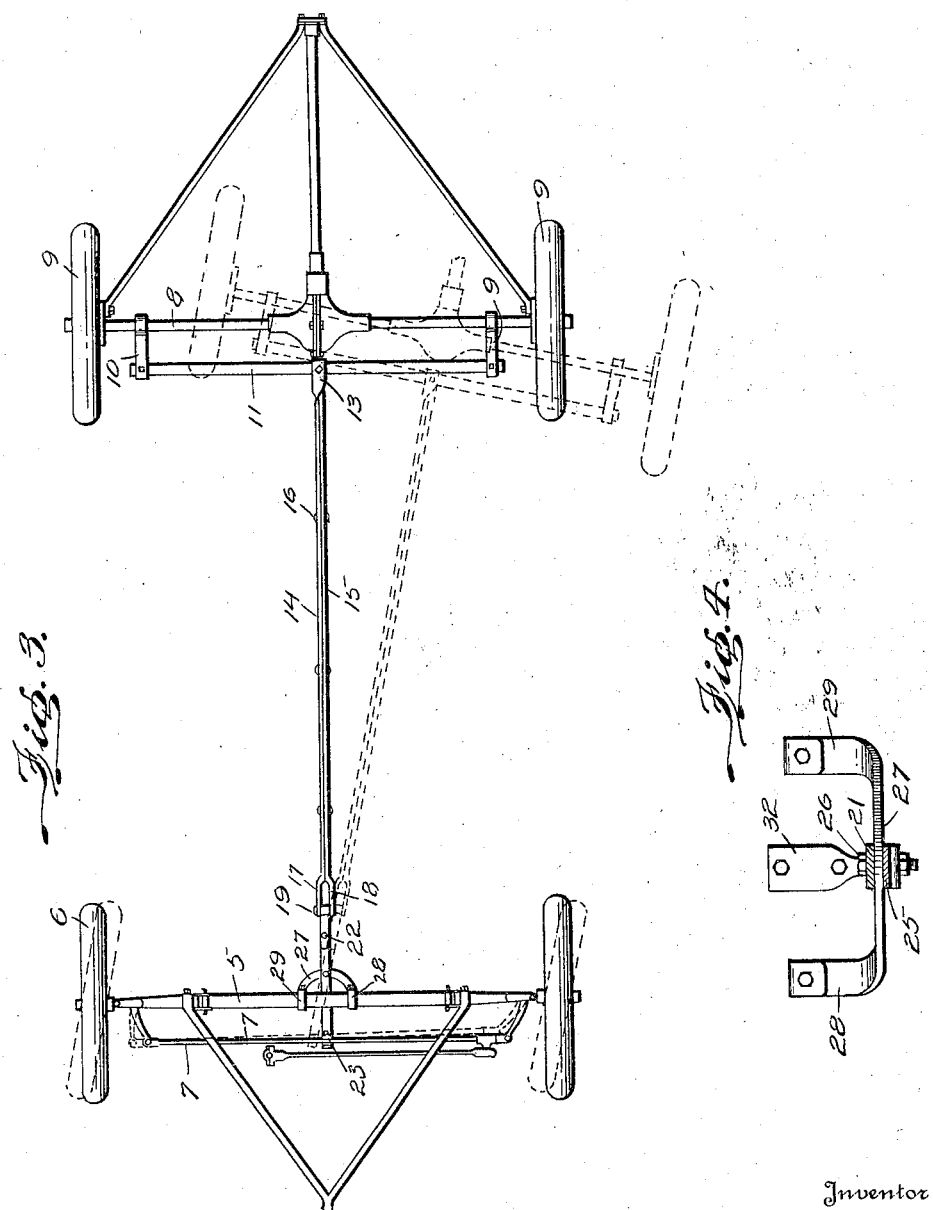
J. W. Osborn, Inventor
By Geo. P. Kimmel, Attorney Patented Dec. 4, 1923.

1,476,638

UNITED STATES PATENT OFFICE.

JOSEPH W. OSBORN, OF LAKE CITY, IOWA.

TOWING DEVICE.

Application filed March 21, 1921. Serial No. 453,973.

*To all whom it may concern:*

Be it known that I, JOSEPH W. OSBORN, a citizen of the United States, residing at Lake City, in the county of Calhoun and State of Iowa, have invented certain new and useful Improvements in Towing Devices, of which the following is a specification.

This invention relates to towing devices and more particularly to that class of devices adapted to be secured to the front portion of an automobile whereby the same may be towed and steered from a position on a propelled machine without resorting to a driver on the machine being towed.

The primary object of the invention resides in the construction of an attachment for towing automobiles wherein the device is secured to the front axle and steering rod of a machine being towed and which will follow directly in the path of the propelled machine, provision being had whereby the steering mechanism on the rear machine will be actuated subsequent to the turning of the rear wheels of the propelled machine.

A still further object of the invention resides in the construction of a towing device capable of universal use in connection with various types of automobiles and which may be attached to the front axle and steering rod of a "dead" machine whereby the same may be towed and wherein the attachment may be removed from the said axle and steering rod with facility and ease and in no way affecting their operation.

Another and very important object of the invention resides in the construction of a towing device which may be extremely simple, consisting of comparatively few parts therefore inexpensive to manufacture, rigid and durable, strong and efficient in operation and use, easily assembled and removed, requiring a minimum of space whereby the same may be easily transported and otherwise meeting the rigid requirements of structures of this character wherein its low cost will insure its commercial possibilities.

With these objects in view and others which will be manifest and suggested as the nature and purpose of my invention are revealed in the following specification and drawing wherein I have shown a preferred embodiment thereof, Figure 1 is a perspective view showing the invention as applied to the front portion of an automobile, Fig. 2 is an enlarged side view of the attachment removed.

Fig. 3 is a plan view showing the invention as applied and connected to a propelled machine.

Fig. 4 is a detail view taken on the line 4—4 of Fig. 2.

Figure 1:
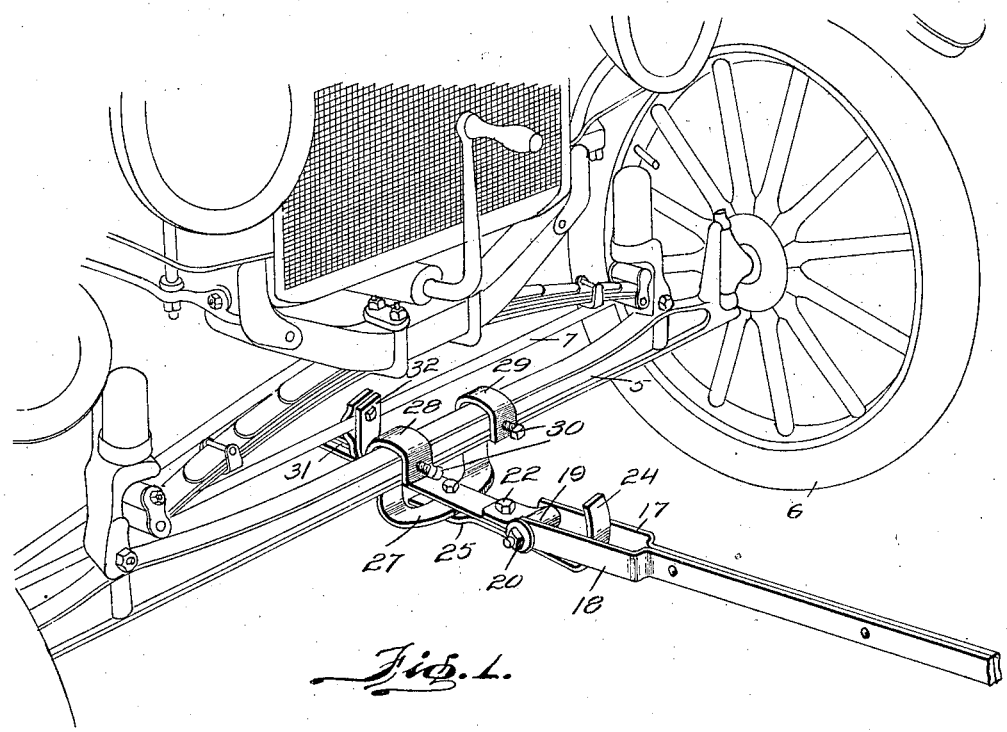

Referring now to the drawings, 5 designates the front axle and 6 the front wheels of a machine being towed, or what will be termed a dead machine, and 7 the steering rod for for said wheels which are of a common and well known construction, typical of the "Ford" automobile. Numeral 8 designates the rear axle and 9 the rear wheels of a propelled machine to which the invention is attached for towing the "dead" machine as is well understood and clearly shown by Fig. 3 of the drawings. A pair of connecting straps 10 secured to the rear axle of the propelled machine are in turn connected by a transverse cross rod 11 which extends rearwardly of the axle and has connected intermediate thereof, the bent ends 13 of a pair of longitudinally extending flat bars 14, 15 riveted together as at 16 thus affording a rigid towing connection between the rear of the propelled machine and the towed machine as is well understood.

The outwardly bent forward portions 17, 18 of the longitudinally extending bars constitute a yoke member which is connected by a horizontal fastening element 19 having a bolt 20, a strap 21 embracing said fastening element 19 and secured as at 22 thus forming a strong and durable connection between the said yoke member and the attaching portion connected to the front axle of the machine being towed.

Figure 2:
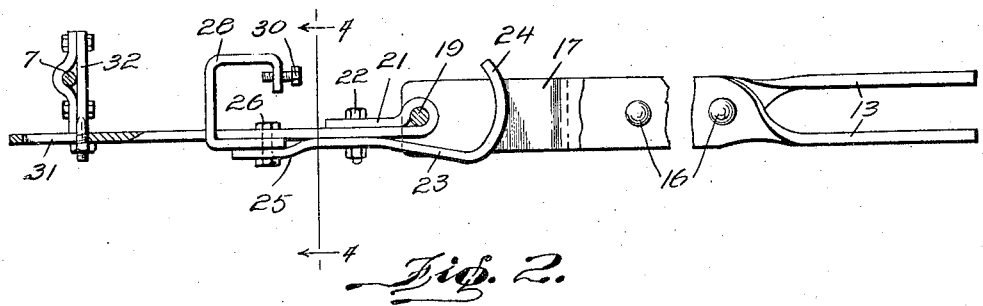

Beneath the strap 21 there is provided a bent, hook shaped member 23, the hook portion 24 thereof extending between the arms forming the yoke at the front of the longitudinally extending bars, the rear portion 25 of said bent element being connected by a vertical bolt and fastening element 26 which passes through the flat horizontal base 27 of an attaching member, which is provided with a pair of clamping arms 28, 29 adapted to embrace the front axle 5 of the machine being towed and securely held thereon by screws or other fastening elements 30 as clearly shown in Fig. 1 of the drawing. It will be observed that the strap 21 extends rearwardly of the attaching member 27 above referred to, being provided with a longitudinal slot 31 which loosely receives another clamping element 32 adapted to embrace the steering rod 7 of the vehicle being towed as suggested by Figs. 1 and 2 of the drawing. It will be observed that the front portion 24 extending between the yoke above referred to will relieve the fastening element 19 from strains or the possibility of its being bent or broken when the machines are being turned. Furthermore, the transverse connection at 19 permits a certain amount of flexible movement between the front and rear of the respective machines to take up and accommodate for the unevenness of the road as will be apparent.

Referring to Fig. 3, it will be of course understood that the rear wheels 9 of the propelled machine will first be turned before movement is imparted to the steering rod 7 which actuates and turns the wheels 6 in the proper direction, as illustrated in dotted lines by said figure.

From the above construction, it will be readily seen that I have provided a novel and useful towing device which is extremely simple in construction, easily assembled and removed when so desired so that it may be stored or transported with facility and ease, and which in its entirety constitutes a very important automobile accessory which can be carried by the machine for use when so desired.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited or restricted to the precise elements shown except in so far as such limitations are specified in the subject matter being claimed.

Having shown and described my invention, what I now claim as new and desire to secure by Letters Patent of the United States is:—

1. In a towing connection for motor vehicles, a draw bar for attachment to the rear axle of a towing machine and provided with a yoke, a fastening element secured to the arms of said yoke and forming a pivotal connection for said bar, a strap embracing said element and loosely connected thereto, a clamping member carried by the free end of said strap for attachment to a connecting rod of the vehicle being towed, an attaching member to be secured to the front axle of the towed machine and to said strap, a hooked bar lying below the strap and attaching member and extended upwardly between the arms of said yoke, and a common fastening element securing said strap attaching member and hooked bar.

2. In a towing connection for motor vehicles comprising a draw bar for attachment to the rear axle of a propelled machine and provided with a yoke, a transverse fastening element secured to the arms of said yoke forming a pivotal connection for the said bar, a strap embracing said element and freely connected thereto, a clamping member carried by the free end of said strap for attachment to the connecting rod of the vehicle being towed, an attaching member having a pair of vertical bent arms forming clamps for embracing the front axle of the towed machine, a hooked flat bar lying beneath the strap and attaching member, and a common fastening element securing said strap, attaching member, and hooked bar.

In testimony whereof, I affix my signature hereto.

JOSEPH W. OSBORN.